US012624641B1

(12) United States Patent
Smiddy et al.

(10) Patent No.: US 12,624,641 B1
(45) Date of Patent: May 12, 2026

(54) INTERSTAGE SEAL WITH PROVISION FOR DEDICATED COOLING FLOW INGRESS AND METHOD

(71) Applicant: RTX Corporation, Farmington, CT (US)

(72) Inventors: Wintson Smiddy, South Windsor, CT (US); Alex Schneider, Manchester, CT (US); Howard Liles, Newington, CT (US); Peter Wilkins, Manchester, CT (US); Paul Lutjen, Kennebunkport, ME (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 19/023,158

(22) Filed: Jan. 15, 2025

(51) Int. Cl.
*F01D 11/00* (2006.01)
*F01D 9/04* (2006.01)
*F01D 11/08* (2006.01)
*F01D 25/12* (2006.01)
*F01D 25/14* (2006.01)

(52) U.S. Cl.
CPC ................ *F01D 11/00* (2013.01); *F01D 9/04* (2013.01); *F01D 11/08* (2013.01); *F01D 25/12* (2013.01); *F01D 25/14* (2013.01); *F05D 2260/202* (2013.01); *F05D 2300/6033* (2013.01)

(58) Field of Classification Search
CPC . F01D 9/023; F01D 9/04; F01D 9/041; F01D 9/042; F01D 11/00; F01D 11/001; F01D 11/02; F01D 11/08; F01D 25/14; F23R 2900/03041; F23R 2900/03042; F23R 2900/03043; F23R 2900/03044; F23R 2900/03045
See application file for complete search history.

(56) References Cited

U.S. PATENT DOCUMENTS

| | | | | |
|---|---|---|---|---|
| 5,407,319 | A * | 4/1995 | Harrogate | F01D 11/005 415/115 |
| 5,417,545 | A * | 5/1995 | Harrogate | F01D 5/186 60/757 |
| 6,170,831 | B1 * | 1/2001 | Bouchard | F16J 15/3288 277/355 |
| 8,961,108 | B2 | 2/2015 | Bergman et al. | |
| 9,879,557 | B2 * | 1/2018 | Hall | F01D 11/005 |
| 10,107,128 | B2 * | 10/2018 | Romanov | F01D 25/12 |

(Continued)

FOREIGN PATENT DOCUMENTS

GB 2454014 A 4/2009

*Primary Examiner* — Christopher R Legendre
(74) *Attorney, Agent, or Firm* — Christopher B. Kilner; Millen, White, Zelano & Branigan, P.C.

(57) ABSTRACT

A cooling flow arrangement for a ceramic matrix composite (CMC) component of a turbine engine, wherein the CMC component includes a hot side configured for exposure to a hot gas path of the turbine engine and an opposing cold side. At least one cavity is provided in the CMC component, the at least one cavity having an entrance disposed on the cold side that is configured for receiving a cooling flow. A seal is disposed adjacent the at least one cavity and the cold side of the CMC component and is configured to provide a seal between the CMC component and an upstream turbine component. At least one hole extends through the seal and is positioned to provide the cooling flow to the at least one cavity of the CMC component.

18 Claims, 5 Drawing Sheets

(56) References Cited

U.S. PATENT DOCUMENTS

| | | | | |
|---|---|---|---|---|
| 10,221,715 | B2 * | 3/2019 | Varney | F01D 25/12 |
| 10,633,995 | B2 * | 4/2020 | Barker | F01D 25/246 |
| 11,242,764 | B2 * | 2/2022 | Smiddy | F01D 25/246 |
| 11,959,422 | B2 | 4/2024 | Karanian et al. | |

* cited by examiner

INTERSTAGE SEAL WITH PROVISION FOR DEDICATED COOLING FLOW INGRESS AND METHOD

FIELD OF THE INVENTION

The subject matter disclosed herein relates to providing cooling flow to ceramic matrix composite (CMC) components and, in particular, to providing dedicated cooling flow ingress through an interstage seal.

BACKGROUND OF THE INVENTION

Gas turbine engines or jet engines, in general, include a fan section, a compressor section, a combustion section, and a turbine section. Air enters through the fan section and is compressed in the compressor section before being introduced into the combustion section. In the combustion section, the air is mixed with fuel and ignited to generate a high-energy, high temperature gas flow. The high-energy, high temperature gas flow is expanded in the turbine section which is used to create thrust and to drive the compressor and fan sections.

Certain components of gas turbine engines are thus exposed to the high-energy, high-temperature gas flow (flow path components). Therefore, it is desirable that such components be made of heat-resistant materials such as ceramic matrix composites (CMCs). CMC components can withstand much higher operating temperatures than components composed of superalloys. However, CMC components have comparably lower thermal conductivity. To increase their operational lifespans, precautions can be taken to cool CMC components by subjecting the components to a flow of cooling fluid (e.g., air).

To provide cooling of CMC components, secondary air flows, i.e., secondary to the main flow of high-energy, high temperature gas, can be used to cool components of the gas turbine engines that are exposed to high temperatures as well as to prevent high temperature gas from reaching those components that are not directly exposed to the hot gas flow. To facilitate the cooling of the CMC components, cavities can be provided within the components themselves to allow secondary cooling air to flow from one region to another region of the turbine. For example, a component such as a blade outer air seal (BOAS, sometimes referred to as a blade shroud) can be provided with an internal cooling cavity to allow cooling air to flow to a region between the engine casing and the outer radial surface of the BOAS into the internal cooling cavity of the BOAS to cool the interior of the component and thereby reduce its thermal deterioration due to exposure to the hot gas path.

However, given the packaging constraints within a turbine engine, the sensitivity of CMC materials to machined features, and the manufacturing difficulties involved with providing cooling circuit components with non-machining techniques (e.g., casting-like processes and the like), feeding of the cooling flow to the internal cavity of the CMC component may be difficult.

The above information disclosed in this Background section is only for understanding of the background of the inventive concepts and, therefore, it may contain information that does not constitute prior art.

SUMMARY OF THE INVENTION

The present disclosure is directed, in a first aspect, to a cooling flow arrangement for a ceramic matrix composite (CMC) component of a turbine engine, wherein the CMC component has a hot side configured for exposure to a hot gas path of the turbine engine and an opposing cold side. The cooling flow arrangement includes at least one cavity in the CMC component, the at least one cavity having an entrance disposed on the cold side configured for receiving a cooling flow. The cooling flow arrangement also includes seal disposed adjacent the at least one cavity and the cold side of the CMC component and configured to provide a seal between the CMC component and an upstream turbine component, and at least one hole extending through the seal and positioned to provide the cooling flow to the at least one cavity of the CMC component.

In an embodiment of the cooling flow arrangement, the at least one hole may be round.

In another embodiment of the cooling flow arrangement, the at least one hole may be straight.

In a further embodiment of the cooling flow arrangement, the at least one hole may include a plurality of holes and the at least one cavity may include an entrance plenum.

In yet another embodiment of the cooling flow arrangement, the plurality of holes may be configured for impingement cooling of the entrance plenum and the entrance plenum may feed a plurality of film cooling holes extending to the hot side of the CMC component.

In an embodiment of the cooling flow arrangement, the entrance plenum may feed a plurality of film cooling holes extending to the hot side of the CMC component.

In another embodiment of the cooling flow arrangement, the at least one cavity may include an entrance plenum and a plurality of film cooling holes extending to the hot side of the CMC component.

In a further embodiment of the cooling flow arrangement, the at least one cavity may include an entrance conduit and a hollow core configured for providing cooling flow to the CMC component.

In yet another embodiment of the cooling flow arrangement, the at least one cavity may include a conduit leading to another portion of the CMC component or an adjacent region of the turbine engine.

In a further embodiment of the cooling flow arrangement, the seal may include a plenum in a lower portion thereof for feeding the at least one cavity in the form of one or more conduits.

The present disclosure is also directed, in a second aspect, to a method of providing a cooling flow to a ceramic matrix composite (CMC) component of a turbine engine, wherein the CMC component has a hot side configured for exposure to a hot gas path of the turbine engine and an opposing cold side. The method includes providing at least one cavity in the CMC component, the at least one cavity having an entrance disposed on the cold side for receiving the cooling flow, disposing a seal adjacent the at least one cavity and the cold side of the CMC component to provide a seal between the CMC component and an upstream turbine component, and passing the cooling flow from a source through at least one hole extending through the seal and positioned to provide the cooling flow to the at least one cavity of the CMC component.

In an embodiment of the method, providing at least one cavity in the CMC component may include providing an entrance plenum, and passing the cooling flow from the source through the at least one hole extending through the seal may include passing the cooling flow through a plurality of holes to the entrance plenum.

In another embodiment of the method, passing the cooling flow through the plurality of holes may provide impingement cooling of the entrance plenum and the entrance plenum may feed a plurality of film cooling holes extending to the hot side of the CMC component to provide film cooling.

In a further embodiment of the method, the entrance plenum may feed a plurality of film cooling holes extending to the hot side of the CMC component to provide film cooling.

In yet another embodiment of the method, providing the cooling flow to the at least one cavity of the CMC component may include providing the cooling flow to an entrance plenum that feeds a plurality of film cooling holes extending to the hot side of the CMC component to provide film cooling.

In an embodiment of the method, providing the cooling flow to the at least one cavity of the CMC component may include providing the cooling flow to an entrance conduit that feeds a hollow core configured for providing cooling flow to the CMC component.

In another embodiment of the method, providing the cooling flow to the at least one cavity of the CMC component may include providing the cooling flow to a conduit leading to another portion of the CMC component or an adjacent region of the turbine engine.

The present disclosure is further directed, in a third aspect, to a cooling flow arrangement for a ceramic matrix composite (CMC) component of a turbine engine, wherein the CMC component has a hot side configured for exposure to a hot gas path of the turbine engine and an opposing cold side. The arrangement includes a cavity formed in the CMC component, the cavity having an entrance disposed on the cold side configured for receiving a cooling flow. The arrangement also includes a brush seal disposed adjacent the cavity and the cold side of the CMC component and configured to provide a seal between the CMC component and an upstream turbine component via first and second metal brushes extending from a central portion, and a hole extending through the central portion of the brush seal and positioned to provide the cooling flow to the cavity of the CMC component.

In an embodiment, the CMC component may be a blade outer air seal (BOAS) and the cavity may include elements selected from a plurality of film cooling holes extending from the cavity to the hot side of the CMC BOAS, at least one conduit leading to another portion of the CMC BOAS, at least one conduit leading to an adjacent region of the turbine engine, and/or a hollow core.

In another embodiment, the hole extending through the central portion of the brush seal may include a plurality of holes.

BRIEF DESCRIPTION OF FIGURES

The features of the disclosure believed to be novel and the elements characteristic of the invention are set forth with particularity in the appended claims. The figures are for illustration purposes only and are not drawn to scale. The disclosure itself, however, both as to organization and method of operation, can best be understood by reference to the description of the preferred embodiment(s) which follows, taken in conjunction with the accompanying drawings in which:

DETAILED DESCRIPTION OF THE INVENTION

Figure 1:
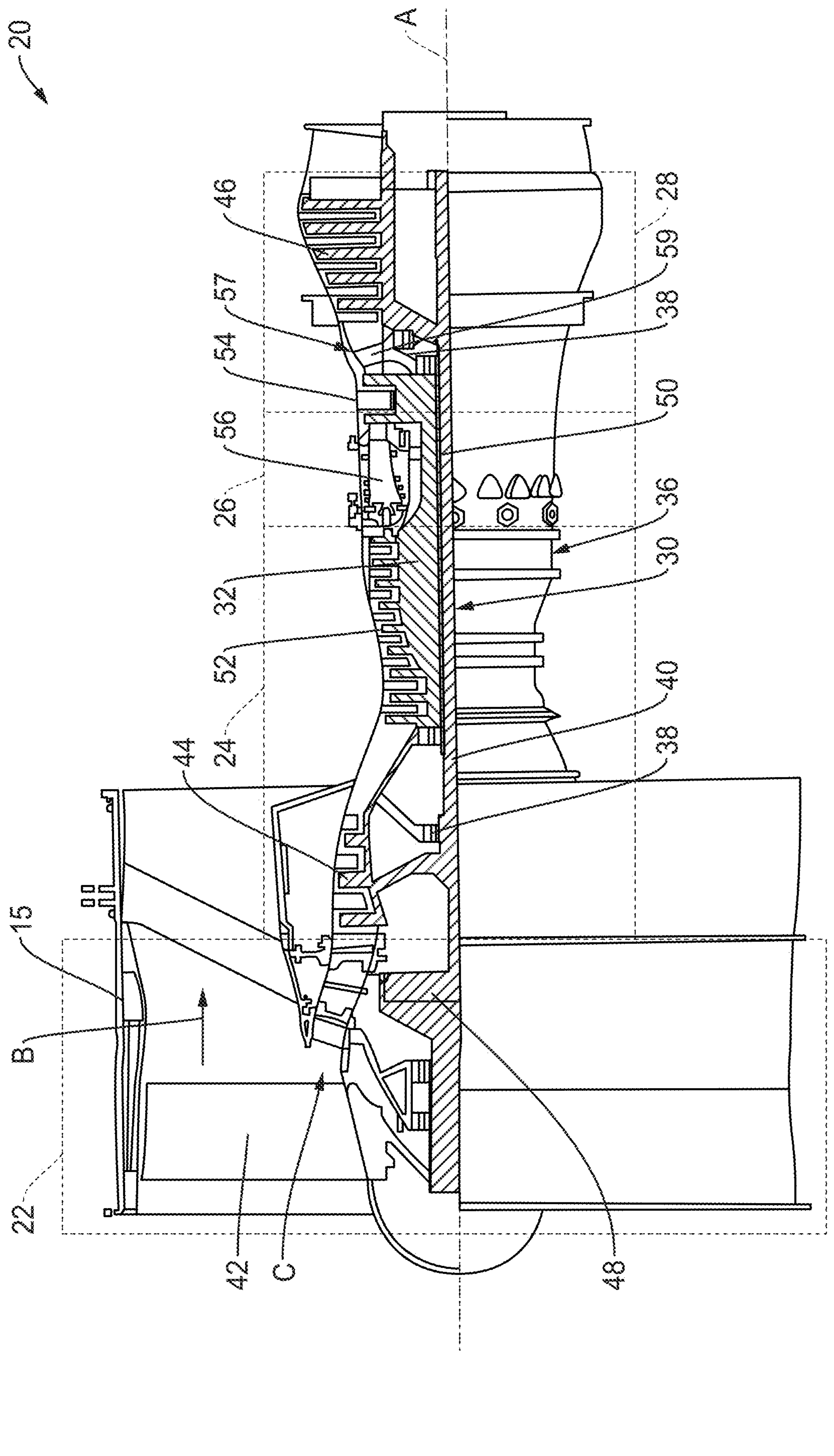
FIG. 1 schematically illustrates a partial cross section of an exemplary gas turbine engine.

The embodiments of the present disclosure can comprise, consist of, and consist essentially of the features and/or steps described herein, as well as any of the additional or optional ingredients, components, steps, or limitations described herein or would otherwise be appreciated by one of skill in the art.

The following discussion omits or only briefly describes conventional features of the disclosed technology that are apparent to those skilled in the art. Reference to a particular embodiment does not limit the scope of the claims attached hereto. Additionally, any examples set forth in this specification are intended to be non-limiting and merely set forth some of the many possible embodiments for the appended claims. Further, particular features described herein can be used in combination with other described features in each of the various possible combinations and permutations. A person of ordinary skill in the art would know how to use the instant invention, in combination with routine experiments, to achieve other outcomes not specifically disclosed in the examples or the embodiments.

Unless otherwise specifically defined herein, all terms are to be given their broadest possible interpretation including meanings implied from the specification as well as meanings understood by those skilled in the art and/or as defined in dictionaries, treatises, etc. Unless defined otherwise, all technical and scientific terms used herein have the same meaning as commonly understood by one of ordinary skill in the art in the field of the disclosed technology. It must also be noted that, as used in the specification and the appended claims, the singular forms "a," "an," and "the" include plural referents unless otherwise specified, and that the terms "includes" and/or "including," when used in this specification, specify the presence of stated features, elements, and/or components, but do not preclude the presence or addition of one or more other features, steps, operations, elements, components, and/or groups thereof. Additionally, methods, equipment, and materials similar or equivalent to those described herein can also be used in the practice or testing of the disclosed technology.

The devices of the present disclosure may be understood more readily by reference to the following detailed description of the embodiments taken in connection with the accompanying drawing figures, which form a part of this disclosure. It is to be understood that this application is not limited to the specific devices, methods, conditions or parameters described and/or shown herein, and that the terminology used herein is for the purpose of describing particular embodiments by way of example only and is not intended to be limiting. All spatial references, such as, for example, proximal, distal, horizontal, vertical, top, upper, lower, bottom, left and right, are for illustrative purposes only and can be varied within the scope of the disclosure. For example, the references “upper” and “lower” are relative and used only in the context to the other, and are not necessarily “superior” and “inferior.”

It will further be understood that, although the terms “first,” “second,” “third,” and the like may be used herein to describe various elements, these elements should not be limited by these terms. These terms are only used to distinguish one element from another element. Thus, “a first element” discussed below could be termed “a second element” or “a third element,” and “a second element” and “a third element” may be termed likewise without departing from the teachings herein.

Various examples of the disclosed technology are provided throughout this disclosure. The use of these examples is illustrative only, and in no way limits the scope and meaning of the invention or of any exemplified form. Likewise, the invention is not limited to any particular preferred embodiment(s) described herein. Indeed, modifications and variations of the invention may be apparent to those skilled in the art upon reading this specification, and can be made without departing from its spirit and scope. The invention is therefore to be limited only by the terms of the claims, along with the full scope of equivalents to which the claims are entitled.

The present disclosure is directed to the provision of dedicated cooling flow ingress into a cavity of a CMC component by providing holes, patterns, or circuits in an adjacent (i.e., interstage) seal. Embodiments of the present disclosure allow cooling flow ingress into a circuit while also sealing the component supply air region against gaspath flow without the need for adding machined or preformed features into the CMC components which could otherwise structurally compromise the component.

While the illustrated examples and discussion below often make reference to a blade outer air seal (BOAS) and BOAS segments, it should be recognized that the present disclosure is not limited to BOAS but includes any CMC component for which a cooling cavity is desirable, for example, combustion liners and vane platforms.

In the discussion below, axial refers to a direction that coincides with the longitudinal axis of the engine. Radial refers to a direction that is radial with respect to the longitudinal axis of the engine. Circumferential refers to a direction that corresponds to the circumference of a circle around the longitudinal axis of the engine. The leading edge/portion of a structure is the edge/portion that faces into the flow of the hot gases, i.e., faces upstream. The trailing edge/portion of a structure is the edge/portion that the faces away from the flow of the hot gases, i.e., faces downstream.

FIG. 1 schematically illustrates an example of a gas turbine engine 20 (i.e., a two-spool turbofan) which includes a fan section 22, a compressor section 24, a combustor section 26, and a turbine section 28. Fan section 22 drives air along a bypass flow path B in a bypass duct defined within a housing 15, and also along a core flow path C for compression in compressor section 24, with subsequent introduction into combustor section 26, followed by expansion through turbine section 28. Although FIG. 1 depicts a two-spool turbofan gas turbine engine, it should be understood that the concepts described herein are not limited to use with two-spool turbofans engines and may be applied to other types of turbine engines.

Engine 20 generally includes a low speed spool 30 and a high-speed spool 32 mounted for rotation about an engine central longitudinal axis A, relative to an engine static structure 36, via several bearing systems 38. Various bearing systems 38 at various locations may alternatively or additionally be provided. The location of bearing systems 38 may be varied as appropriate to the application.

The low speed spool 30 generally includes an inner shaft 40 that interconnects, a first (or low) pressure compressor 44 and a first (or low) pressure turbine 46. Inner shaft 40 is connected to fan 42 through a speed change mechanism, which in this exemplary embodiment is illustrated as a geared structure 48 to drive fan 42 at a lower speed than the low speed spool 30. High speed spool 32 includes an outer shaft 50 that interconnects a second (or high) pressure compressor 52 and a second (or high) pressure turbine 54. Combustor 56 is positioned between high pressure compressor 52 and high-pressure turbine 54. A mid-turbine frame 57 of the engine static structure 36 may be arranged generally between the high-pressure turbine 54 and the low-pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core air flow is first compressed by low pressure compressor 44, and then by the high-pressure compressor 52. Thereafter, the core air flow is mixed and burned with fuel in combustor 56, then expanded in high pressure turbine 54 and low-pressure turbine 46. The mid-turbine frame 57 includes airfoils 59 which are in the core airflow path C. The turbines 46 and 54 rotationally drive the respective low speed spool 30 and high-speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low-pressure compressor, or aft of the combustor section 26 or even aft of turbine section 28, and fan 42 may be positioned forward or aft of the location of gear system 48.

The turbine section 28 includes at least one rotor and at least one blade extending radially outwardly from the rotor. The turbine section 28 may further include a blade outer air seal(s) (BOAS(s)). The blade outer air seal can be an assembly of a plurality of BOAS segments that together form an annular shaped shroud around the engine's central longitudinal axis A which is positioned between an outer casing of the engine and the turbine blade(s) of the turbine section.

With reference to FIGS. 2A, 2B, 20, 2D, 2E, 2F, and 2G, various embodiments of a cooling flow arrangement 200 for a CMC component 210 of a turbine engine in accordance with the present disclosure are illustrated, wherein like elements have the same reference numerals. While CMC component 210 is illustrated as a leading-edge portion of a BOAS, embodiments in accordance with the present disclosure are not limited thereto, and may include any portion of any CMC component for which ingress of a cooling flow is desirable, for example, combustion liners and vane platforms.

In various embodiments, the CMC component 210 has a hot side 230 configured for exposure to a hot gas path 232 of the turbine engine and an opposing cold side 240. The CMC component 210 includes at least one cavity 220. The at least one cavity 220 includes an entrance disposed on the cold side 240 that is configured for receiving a cooling flow (illustrated with dotted arrows). In the embodiments of FIGS. 2A-2D, the entrance may be an open top of a cavity 220. In the embodiment of FIGS. 2E-2F, the entrance may be in the form of an entrance to a hole or passage 226 feeding a hollow cavity 220 as illustrated in FIG. 2E or an entrance to a conduit 220 that forms the cavity 220 as illustrated in FIG. 2F.

The at least one cavity 220 may be formed in any suitable manner. For example, in an embodiment where the cavity 220 has an open top (e.g., FIGS. 2A-2D), the cavity 220 may be initially formed in a preform or a partially-densified preform for inclusion in the densified CMC component, or may be formed by machining and/or grinding of a densified CMC component. In an embodiment where cavity 220 includes a hollow core (FIG. 2E), the core may be formed by preforming/densification using one or more captive mandrel, by preforming/densification without use of a captive mandrel, or by machining/grinding of a densified component followed by attachment of a cover.

In various embodiments, the cavity 220 may act as a plenum for feeding the cooling flow to other locations within the CMC component 210 or the turbine assembly. For example, as illustrated in the embodiments of FIGS. 2A-2D, the cavity 220 may feed the cooling flow to one or more film cooling holes to provide film cooling to the hot side 230 and/or as illustrated in FIG. 2D, may supply cooling flow to other cooling circuits 224 within CMC component 210.

In each illustrated embodiment, a seal 260 is disposed adjacent the at least one cavity 220 and the cold side 240 of the CMC component 210. In the example embodiments, the seal 260 is a brush seal with a first sealing element 264 formed of metal bristles providing a seal against a portion of CMC component 210, and a second sealing element 264 formed of metal bristles providing a seal against an adjacent upstream component. Accordingly, the seal 260 is configured to provide a seal between the CMC component 210 and an upstream turbine component (not shown). However, embodiments of the present disclosure are not limited to brush seals, and other seals such as W-seals, feather seals, and the like may be used.

Although not illustrated, in many instances the seal 260 may also include features to provide a seal between the portion of the seal 260 (e.g., lower portion as illustrated) and the cold side 240 of the CMC component 210.

In accordance with the present disclosure, seal 260 includes at least one hole 262 extending through the seal 260 and positioned to provide ingress of a cooling flow from a high-pressure, low-temperature source 250 to the at least one cavity 220 of the CMC component 210. The hole(s) 262 may have circular or non-circular (polygonal, elliptical, irregular, etc.) cross-sections, may be straight or not (i.e., curved, segmented, etc.), and/or may vary in cross-section (e.g., expanding, contracting, or combinations thereof). When a plurality of holes 262 are included, the holes 262 may be the same size or may be of different sizes, the holes 262 may be parallel or non-parallel, and/or the holes 262 may be regularly patterned or not (e.g., irregularly patterned or a combination patterns).

Seal 260 may be made of metal alloy, such as high-temperature Ni and Co alloys. When Ni alloys are used, a coating may be provided on contacting portions of the seal 260 or CMC component for compatibility reasons. Within a turbine, such interstage seals 260 will typically be ring shaped and, as discussed herein, the term "seal" refers to the seal 260 interaction with a single segment, such as a single CMC BOAS segment. Thus, a seal 260 with a single hole 262 as in FIG. 2A may have a single hole 262 for each CMC BOAS segment comprising CMC component 210 or a subset thereof (and thus, as a whole, include a plurality of holes). Additionally, the seal 260 may have different numbers of holes 262 at different segments without departing from the scope of the present disclosure.

When seal 260 is a brush seal, the hole(s) 262 may be formed through the inner diameter and outer diameter backing plates that hold the metal brush bristles, such as by drilling or casting, so as to permit the ingress of a cooling flow.

Figure 2A:
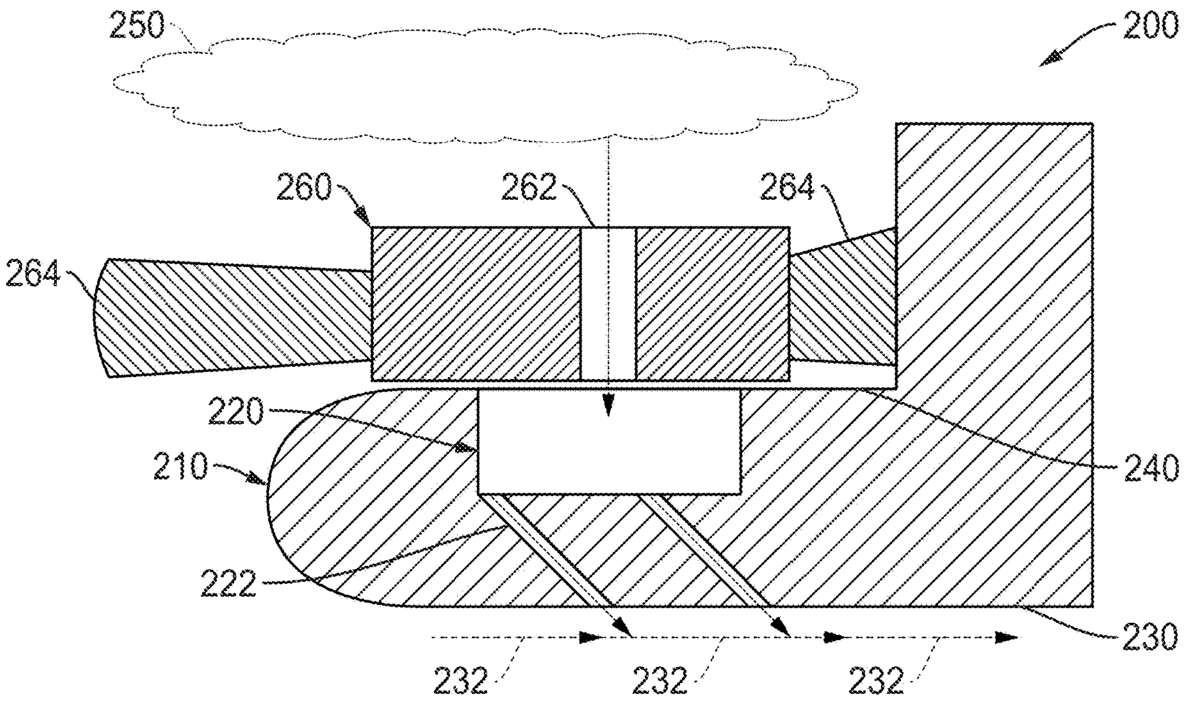
FIG. 2A schematically illustrates a partial cross section of an example embodiment of a cooling flow arrangement in accordance with the present disclosure.
Figure 2B:
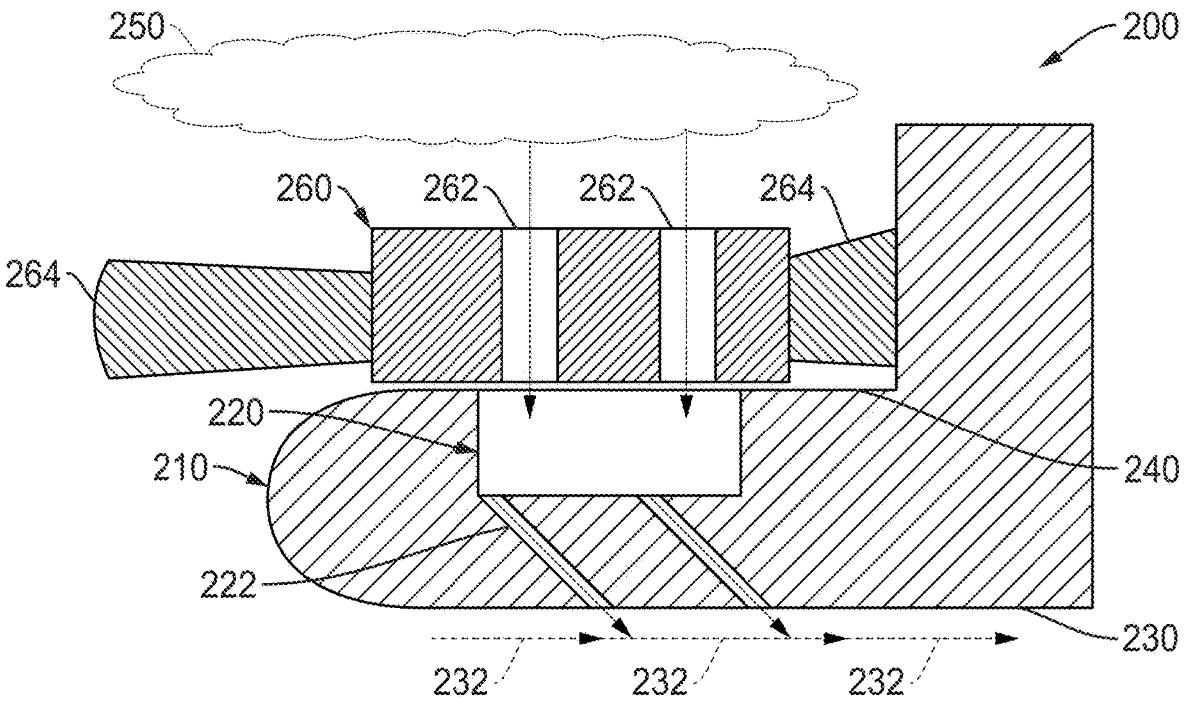
FIG. 2B schematically illustrates a partial cross section of another example embodiment of a cooling flow arrangement in accordance with the present disclosure.
Figure 2C:
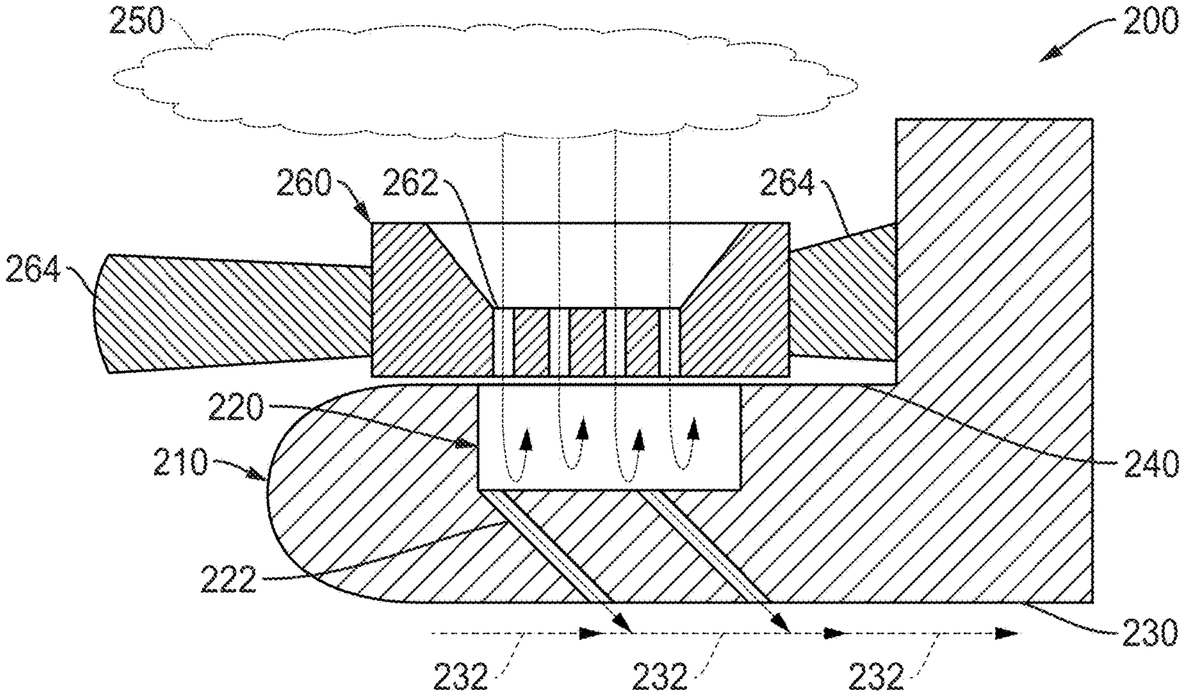
FIG. 2C schematically illustrates a partial cross section of a further example embodiment of a cooling flow arrangement in accordance with the present disclosure.
Figure 2D:
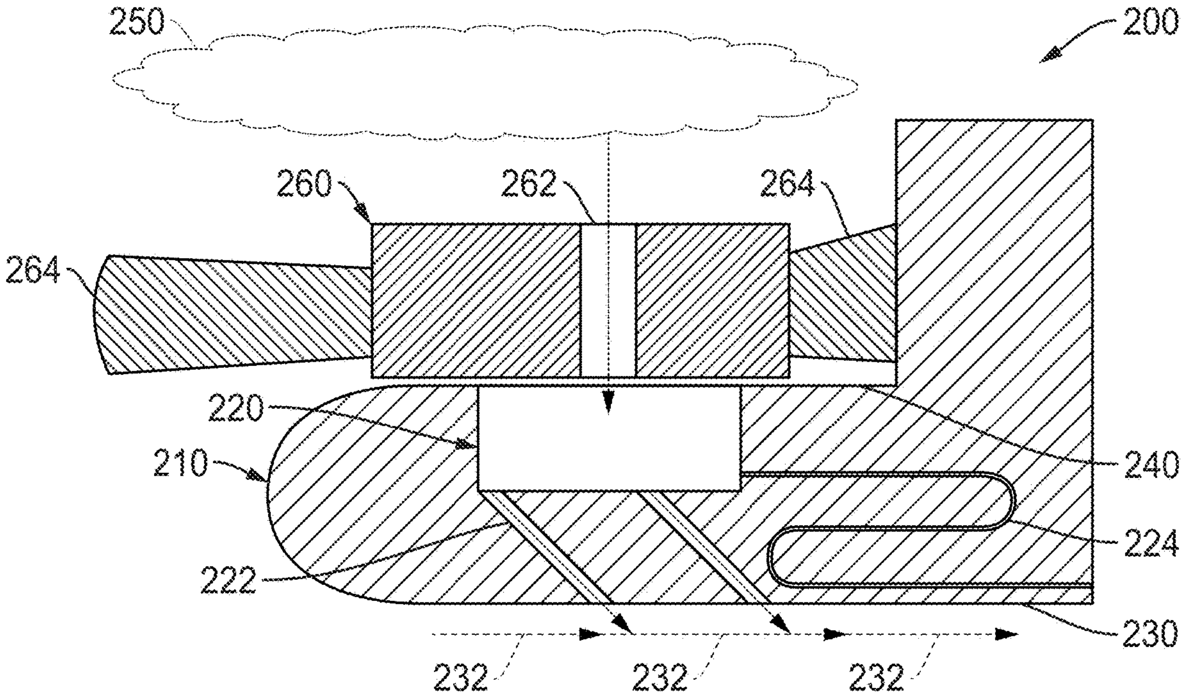
FIG. 2D schematically illustrates a partial cross section of yet another example embodiment of a cooling flow arrangement in accordance with the present disclosure.
Figure 2E:
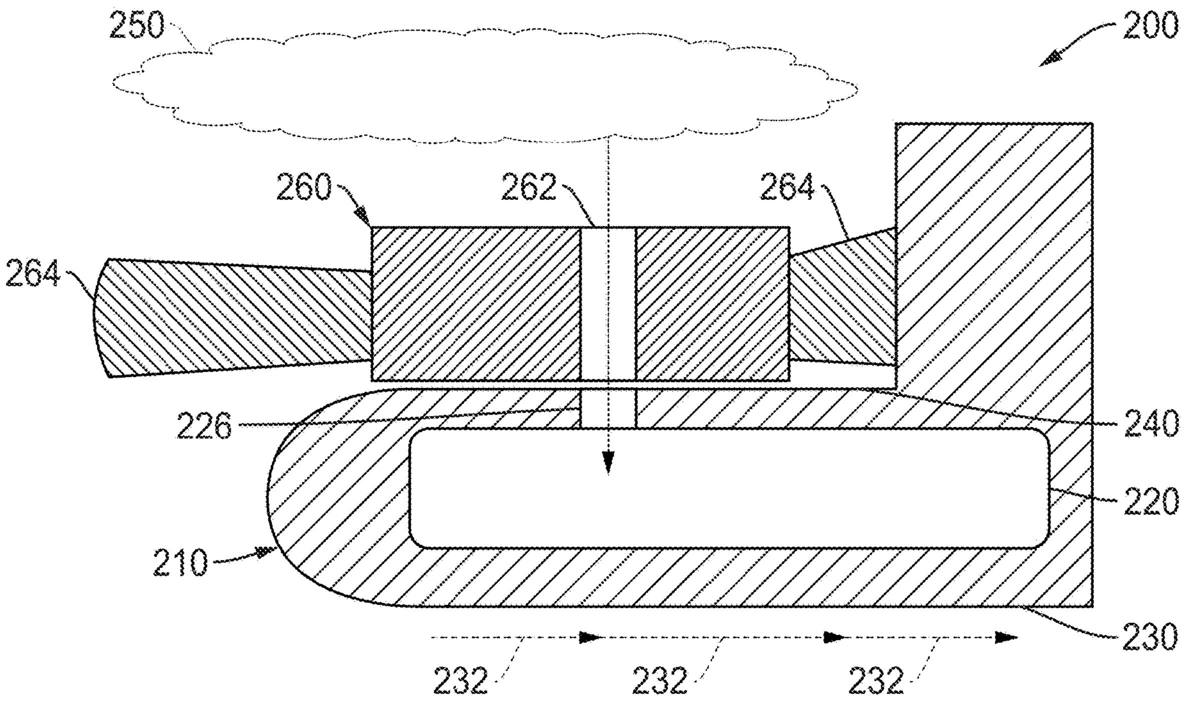
FIG. 2E schematically illustrates a partial cross section of an example embodiment of a cooling flow arrangement in accordance with the present disclosure.
Figure 2F:
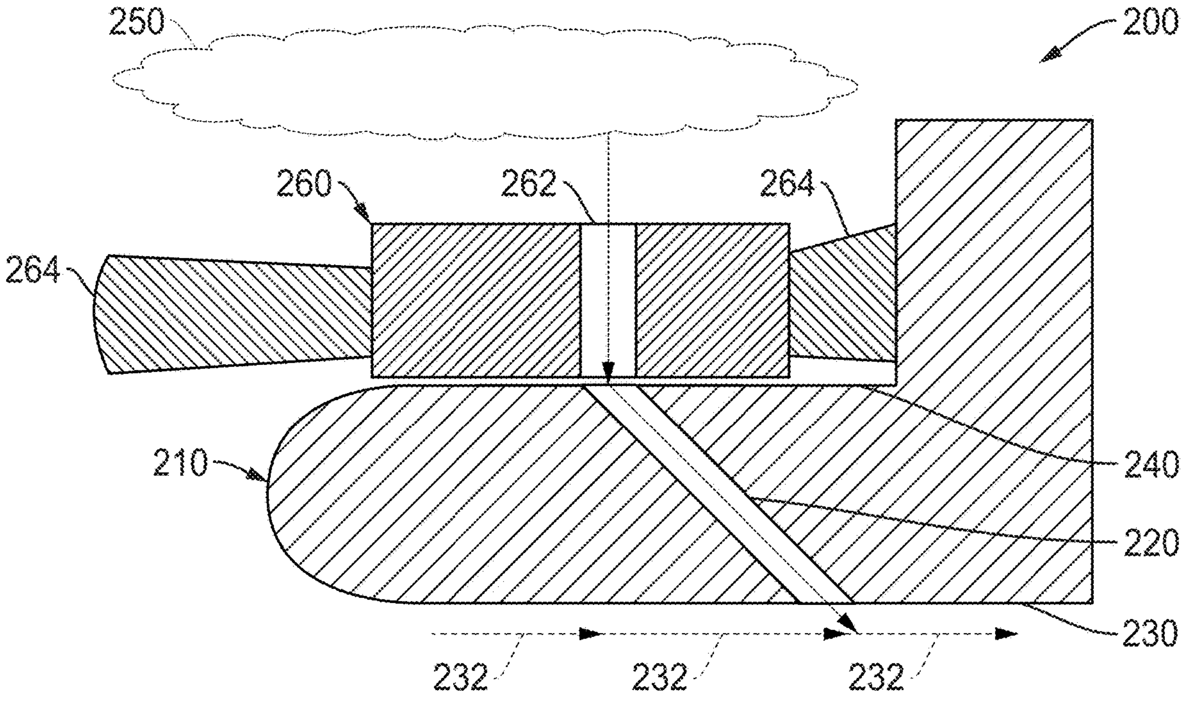
FIG. 2F schematically illustrates a partial cross section of another example embodiment of a cooling flow arrangement in accordance with the present disclosure.

As illustrated in FIGS. 2B and 2C, in various embodiments the at least one hole 262 includes a plurality of holes 262 and the at least one cavity 220 acts as an entrance plenum. In the embodiment of FIG. 2B, the entrance plenum/cavity 220 feeds a plurality of film cooling holes 222 extending to the hot side 230 of the CMC component 210. In the embodiment of FIG. 2C, the plurality of holes 262 is further configured to provide impingement cooling of the entrance plenum/cavity 220, and the entrance plenum/cavity 220 feeds a plurality of film cooling holes 222 extending to the hot side 230 of the CMC component 210.

As illustrated in FIG. 2E, the at least one cavity may include an entrance conduit 226 and a hollow core 220 configured for providing cooling flow to the CMC component 210 or an adjacent region of the turbine engine (not shown). Further, as illustrated in FIG. 2F, the at least one cavity 220 may be formed as a conduit 220 leading to another portion of the CMC component 210 or an adjacent region of the turbine engine. Although FIG. 2F discloses a single hole 262 and a single conduit 220, embodiments are not limited thereto, and may include multiple holes 262 and/or conduits 220.

Figure 2G:
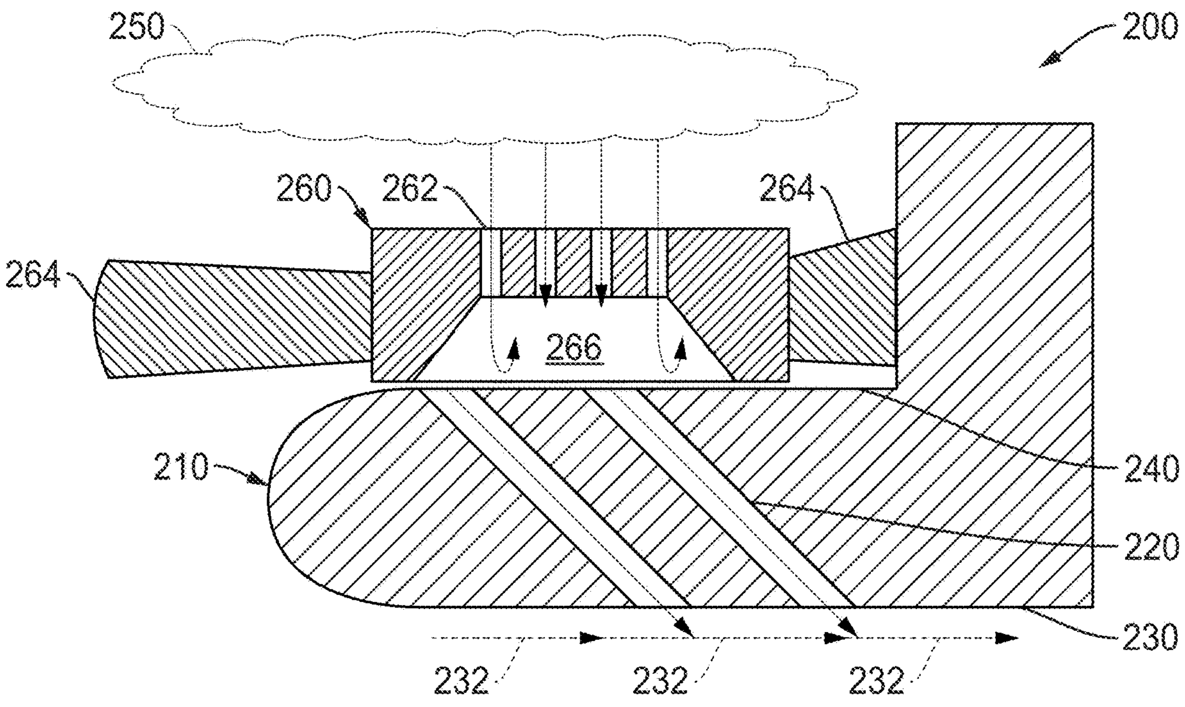
FIG. 2G schematically illustrates a partial cross section of a further example embodiment of a cooling flow arrangement in accordance with the present disclosure.

As illustrated in FIG. 2G, in certain embodiments, such as when the one or more cavities 220 are in the form of a conduit 220, the registration of hole or holes 262 with conduit or conduits 220 may be subject to misalignment. Accordingly, in one or more embodiments, the seal 260 may include a plenum 266 formed as a wide cavity in a lower portion thereof to receive cooling flow from hole(s) 262 (e.g., four holes 262 in this example) and then feed the cooling flow to conduit(s) 220 (e.g., two conduits 220 in this example) to address possible misalignment.

Thus, as illustrated in FIGS. 2A-2G, one or more embodiments of the present disclosure may be drawn to a cooling flow arrangement 200 for a CMC component 210 of a turbine engine, wherein the CMC component 210 has a hot side 230 configured for exposure to a hot gas path 232 of the turbine engine and an opposing cold side 240. The CMC component 210 includes a cavity 220 formed therein, the cavity 220 having an entrance disposed on the cold side 240 that is configured for receiving a cooling flow. A brush seal 260 is disposed adjacent the cavity 220 and the cold side 240 of the CMC component 210. The brush seal 260 is configured to provide a seal between the CMC component 210 and an upstream turbine component (not shown) via first and second metal brushes 264 extending from a central portion of the brush seal 260. The brush seal 260 further includes a hole 262 extending through the central portion of thereof and the hole 262 is positioned to provide the cooling flow to the cavity 220 of the CMC component 210.

In an embodiment, the CMC component 210 may be a blade outer air seal (BOAS) and the cavity 220 includes elements selected from a plurality of film cooling holes 222 extending from the cavity 220 to the hot side 230 of the CMC BOAS (see, e.g., FIGS. 2A, 2B, 2C, and 2D), at least one conduit 220 (see, e.g., FIGS. 2F and 2G) or conduit 224 (see, e.g., FIG. 2D) leading to another portion of the CMC BOAS, at least one conduit 224 leading to an adjacent region of the turbine engine (see, e.g., FIG. 2D), and/or a hollow core 220 (see, e.g., FIG. 2E).

In one or more embodiments, the hole 262 extending through the central portion of the brush seal 260 may include a plurality of holes 262 (see, e.g., FIGS. 2B, 2C, and 2G).

Figure 3:
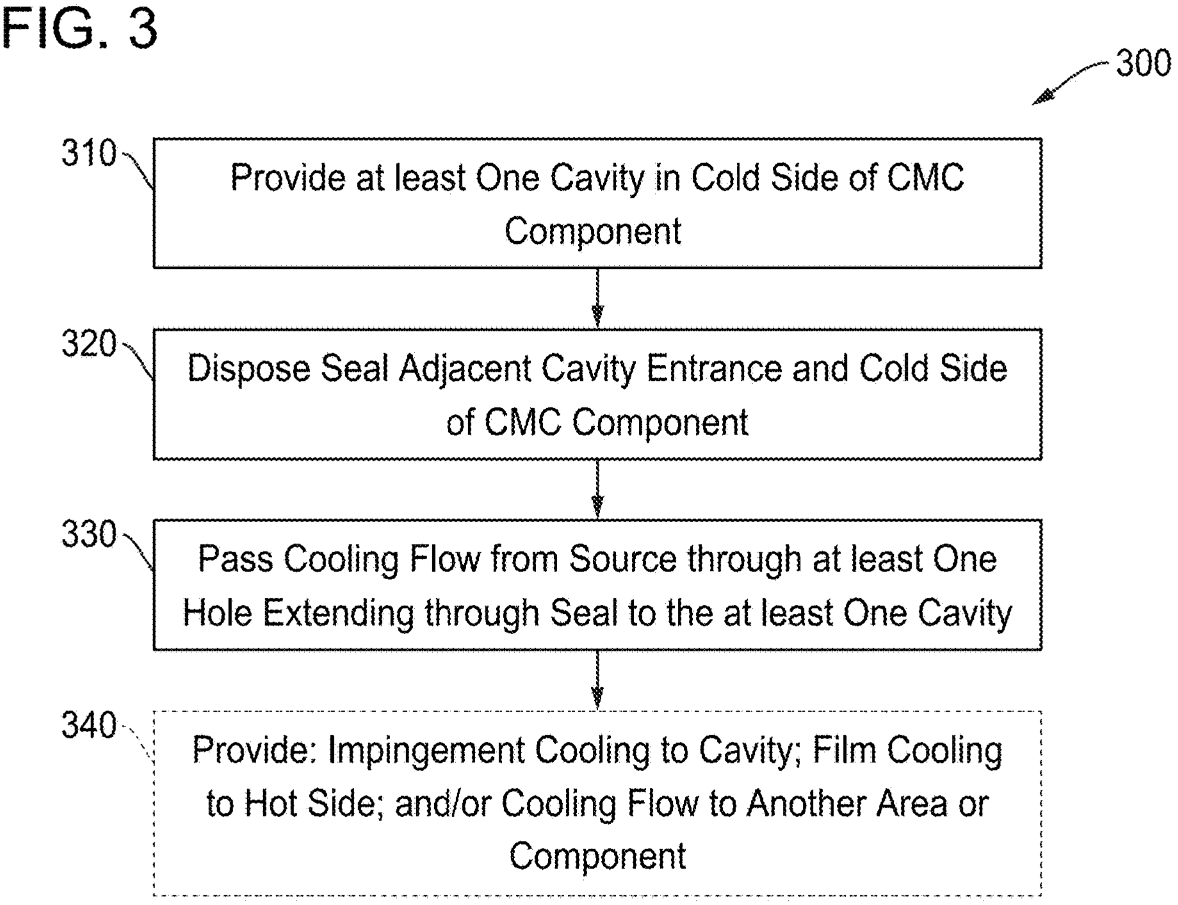
FIG. 3 is a flow diagram of an example process in accordance with the present disclosure.

With reference to FIG. 3, an example flow diagram of a method 300 of providing a cooling flow to a CMC component 210 of a turbine engine is disclosed, wherein the CMC component 210 includes a hot side 230 configured for exposure to a hot gas path 232 of the turbine engine and an opposing cold side 240.

The method 300 includes a step 310 of providing at least one cavity 220 in the CMC component 210, wherein the at least one cavity 220 includes an entrance disposed on the cold side 240 for receiving the cooling flow, such as from a cooling flow source 250 of high-pressure, low-temperature air which may, for example, be bled off from a compressor 44 or 52 of the turbine.

The method 300 further includes a next step 320 that includes disposing a seal 260 adjacent the at least one cavity 220 and the cold side 240 of the CMC component 210 to provide a seal between the CMC component 210 and an upstream turbine component (not shown). Typically, seal 260 will include first and second sealing elements 264 to provide seals against a portion of the CMC component 210 and the upstream or adjacent turbine component, respectively.

In a next step 330, the cooling flow from a high pressure/low temperature source 250 is passed through at least one hole 262 that extends through the seal 260 and is positioned to provide the cooling flow to the at least one cavity 220 of the CMC component 210.

In one or more embodiments, step 320 of providing at least one cavity 220 in the CMC component 210 may include providing an entrance plenum, and step 330 of passing the cooling flow from the high pressure/low temperature source 250 through the at least one hole 262 extending through the seal 260 may include passing the cooling flow through a plurality of holes 262 to the entrance plenum.

In an optional step at 340, passing the cooling flow through the plurality of holes 262 may provide impingement cooling of the entrance plenum. In another possible optional step at 340, providing the cooling flow to the at least one cavity 220 of the CMC component 210 may include providing the cooling flow to an entrance plenum that feeds a plurality of film cooling holes 222 extending to the hot side 230 of the CMC component 210 to provide film cooling. In a further option step at 340, providing the cooling flow to the at least one cavity 220 of the CMC component 210 may include providing the cooling flow to an entrance conduit 226 that feeds a hollow core 220 configured for providing cooling flow to the CMC component 210 or another component, such as in an adjacent region of the turbine engine.

In various embodiments, passing the cooling flow through the plurality of holes 262 may provide impingement cooling of the entrance plenum and the entrance plenum may feed a plurality of film cooling holes 222 extending to the hot side 230 of the CMC component 210 to provide film cooling. In another optional step at 340, the entrance plenum may feed a plurality of film cooling holes 222 extending to the hot side 230 of the CMC component 210 to provide film cooling.

Embodiments in accordance with the present disclosure allow cooling flow ingress into a circuit while also sealing the component supply air region against gaspath flow. Further, this can be accomplished without adding additional machined and/or preformed features to the CMC component which could otherwise structurally compromise the part.

While the present disclosure has been particularly described, in conjunction with specific preferred embodiments, it is evident that many alternatives, modifications and variations will be apparent to those skilled in the art in light of the foregoing description. It is therefore contemplated that the appended claims will embrace any such alternatives, modifications and variations as falling within the true scope and spirit of the present disclosure.

What is claimed is:

1. A cooling flow arrangement for a ceramic matrix composite (CMC) component of a turbine engine, the CMC component having a hot side configured for exposure to a hot gas path of the turbine engine and an opposing cold side, comprising:

- a cavity formed in the CMC component, the cavity having an entrance disposed on the cold side configured for receiving a cooling flow;
- a brush seal disposed adjacent the cavity and the cold side of the CMC component and configured to provide a seal between the CMC component and an upstream turbine component via first and second metal brushes extending from a central portion; and
- a hole extending through the central portion of the brush seal and positioned to provide the cooling flow to the cavity of the CMC component.

2. The cooling flow arrangement of claim 1, wherein the hole is round.

3. The cooling flow arrangement of claim 1, wherein the hole is straight.

4. The cooling flow arrangement of claim 1, wherein the hole includes a plurality of holes and the cavity includes an entrance plenum.

5. The cooling flow arrangement of claim 4, wherein the plurality of holes is configured for impingement cooling of the entrance plenum and the entrance plenum feeds a plurality of film cooling holes extending to the hot side of the CMC component.

6. The cooling flow arrangement of claim 4, wherein the entrance plenum feeds a plurality of film cooling holes extending to the hot side of the CMC component.

7. The cooling flow arrangement of claim 1, wherein the cavity includes an entrance plenum and a plurality of film cooling holes extending to the hot side of the CMC component.

8. The cooling flow arrangement of claim 1, wherein the cavity includes an entrance conduit and a hollow core configured for providing cooling flow to the CMC component.

9. The cooling flow arrangement of claim 1, wherein the cavity includes a conduit leading to another portion of the CMC component or an adjacent region of the turbine engine.

10. The cooling flow arrangement of claim 9, wherein the brush seal includes a plenum in a lower portion thereof for feeding the conduit.

11. The cooling flow arrangement of claim 1, wherein the CMC component is a blade outer air seal (BOAS).

12. A method of providing a cooling flow to a ceramic matrix composite (CMC) component of a turbine engine, the CMC component having a hot side configured for exposure to a hot gas path of the turbine engine and an opposing cold side, the method comprising:

providing cavity in the CMC component, the cavity having an entrance disposed on the cold side for receiving the cooling flow;

disposing a brush seal adjacent the cavity and the cold side of the CMC component to provide a seal between the CMC component and an upstream turbine component; and passing the cooling flow from a source through hole extending through the brush seal and positioned to provide the cooling flow to the cavity of the CMC component.

13. The method of claim 12, wherein providing cavity in the CMC component includes providing an entrance plenum, and passing the cooling flow from the source through the hole extending through the brush seal includes passing the cooling flow through a plurality of holes to the entrance plenum.

14. The method of claim 13, wherein passing the cooling flow through the plurality of holes provides impingement cooling of the entrance plenum and the entrance plenum feeds a plurality of film cooling holes extending to the hot side of the CMC component to provide film cooling.

15. The method of claim 13, wherein the entrance plenum feeds a plurality of film cooling holes extending to the hot side of the CMC component to provide film cooling.

16. The method of claim 12, wherein providing the cooling flow to the cavity of the CMC component includes providing the cooling flow to an entrance plenum that feeds a plurality of film cooling holes extending to the hot side of the CMC component to provide film cooling.

17. The method of claim 12, wherein providing the cooling flow to the cavity of the CMC component includes providing the cooling flow to an entrance conduit that feeds a hollow core configured for providing cooling flow to the CMC component.

18. The method of claim 12, wherein providing the cooling flow to the cavity of the CMC component includes providing the cooling flow to a conduit leading to another portion of the CMC component or an adjacent region of the turbine engine.

* * * * *